United States Patent [19]
Screptock et al.

[11] Patent Number: 5,979,478
[45] Date of Patent: *Nov. 9, 1999

[54] APPARATUS AND METHOD FOR TREATING WATER IN A WATER SUPPLY SYSTEM

[76] Inventors: Andrew D. Screptock; Sylvia J. Screptock, both of 133 Eagle Point Dr., Rossford, Ohio 43460

[*] Notice: This patent is subject to a terminal disclaimer.

[21] Appl. No.: 08/851,101

[22] Filed: May 5, 1997

[51] Int. Cl.$^6$ .................................................. G05D 11/02
[52] U.S. Cl. ......................... 137/3; 137/101.25; 417/80; 417/5; 417/38
[58] Field of Search ........................ 137/3, 216.1; 417/4, 417/5, 36, 38, 79, 80

[56] References Cited

U.S. PATENT DOCUMENTS

| | | | |
|---|---|---|---|
| 1,081,181 | 12/1913 | Willis | 417/79 |
| 2,162,074 | 6/1939 | Everson | 417/79 |
| 2,341,517 | 2/1944 | Wieland | 417/80 |
| 2,763,281 | 9/1956 | Morgan | 417/80 |
| 3,345,997 | 10/1967 | Miller | 137/101.25 |
| 3,705,598 | 12/1972 | Ray | 137/101.25 |
| 4,444,259 | 4/1984 | Schwall . | |
| 5,008,075 | 4/1991 | Rufolo . | |
| 5,015,370 | 5/1991 | Fricano . | |
| 5,040,487 | 8/1991 | Bollyky et al. . | |
| 5,080,805 | 1/1992 | Houser . | |
| 5,103,914 | 4/1992 | LaHaye . | |
| 5,192,451 | 3/1993 | Gill . | |
| 5,209,934 | 5/1993 | Ekis, Jr. et al. . | |
| 5,229,125 | 7/1993 | Patarcity et al. . | |
| 5,253,954 | 10/1993 | Landsberger . | |
| 5,256,310 | 10/1993 | Brooks . | |
| 5,368,748 | 11/1994 | Sanderson . | |

*Primary Examiner*—Denise L. Ferensic
*Assistant Examiner*—Ramyar Farid
*Attorney, Agent, or Firm*—John C. Purdue; David C. Purdue

[57] ABSTRACT

Apparatus for delivering a water treatment chemical to a water intake in a water system is disclosed. The water system has a water inlet and a pump for withdrawing water from a natural body of water, such as an underground aquifer, a river, a lake or the like. In a water system that draws water from a body of water that is inhabited by zebra mussels, the apparatus is operable, when water is being drawn into the system, to deliver a zebra mussel control agent to the inlet of the system to eliminate zebra mussels, if present, from the water system and to prevent the infestation of the water system by zebra mussels. In a water system that draws water from an underground aquifer, the apparatus is operable, when the system is drawing water, to deliver a water treatment chemical to or near the water inlet for the system and to cause thorough mixing of the water treatment chemical with the water, before it reaches a reservoir in the system, whereby undesired impurities are controlled or removed from the water. When the system is not drawing water, the apparatus is operable to prevent the discharge of the water treatment chemical.

5 Claims, 7 Drawing Sheets

APPARATUS AND METHOD FOR TREATING WATER IN A WATER SUPPLY SYSTEM

FIELD OF THE INVENTION

This invention is directed to apparatus for delivering a water treatment chemical to a water intake in a water system which has a water inlet and a pump for withdrawing water from a natural body of water, such as an underground aquifer, a river, a lake or the like. In a water system that draws water from a body of water that is inhabited by zebra mussels, the apparatus is operable, when water is being drawn into the system, to deliver a zebra mussel control agent to the inlet of the system to eliminate zebra mussels, if present, from the water system and to prevent the infestation of the water system by zebra mussels. In a water system that draws water from an underground aquifer, the apparatus is operable, when the system is drawing water, to deliver a water treatment chemical to or near the water inlet for the system and to cause thorough mixing of the water treatment chemical with the water, before it reaches a reservoir in the system, whereby undesired impurities are controlled or removed from the water.

BACKGROUND OF THE INVENTION

According to a recent publication (*Zebra Mussels: a 1992 Great Lakes Overview, the Great Lakes Sea Grant Network,* 1992):

zebra mussels were discovered in the Great Lakes in 1988;

since their discovery, they have been sighted in all of the great lakes and in the Hudson, Susquehanna, Ohio, Illinois, Tennessee and Mississippi river systems;

scraping, once or twice a month, is the recommended method for removal from docks and piers, where a large buildup should be avoided because their waste products can cause damage;

mussels can attach to outdrives of boats that remain in infested water, covering or entering water intakes, clogging cooling systems and damaging cooling system parts, and causing excessive drivetrain wear by attaching to props and shafts;

mussels can attach to private and municipal water intakes, can even invade water systems and, in extreme cases, can completely clog household plumbing systems; and chlorination, at the point of raw water intake, has proved to be effective in controlling zebra mussels.

Zebra mussel infestation of water supply systems poses problems not only in terms of blockage of intake pipes but, more significantly, blockage of piping within the water system requiring, eventually, the replacement of all of the affected plumbing.

THE PRIOR ART

In a search for prior art directed to apparatus, according to the present invention, for treating zebra mussel infested water, the following patents were noted.

U.S. Pat. No. 5,008,075, Apr. 16, 1991, "Rufolo", discloses apparatus for introducing a chemical into an underwater intake pipe. The apparatus includes a first feed pipe through which the chemical flows from a pump house to a second feed pipe which is attached to an intake pipe adjacent an intake pipe opening, and a plurality of releasing valves through which the chemical flows from the second feed pipe into the interior of the intake pipe.

U.S. Pat. No. 5,368,748, Nov. 29, 1994, "Sanderson", discloses apparatus and a method for treating water magnetically, "thereby reducing the requirements and cost of water-system maintenance and the quantity of toxic chemical treatments released to the environment."

U.S. Pat. No. 5,256,310, Oct. 26, 1993, "Brooks", discloses the use of chlorine dioxide for the treatment of water at an offshore water intake facility. The use of a generator on a portable vessel for the generation of the chlorine dioxide is disclosed.

U.S. Pat. No. 5,253,954, Oct. 19, 1993, "Landsberger", discloses the use a plurality of alternate water intake pipes for a water treatment plant or a power plant. When one of the intake pipes becomes clogged by zebra mussels, water flow through that pipe is discontinued "which causes starvation of the mussels due to suffocation."

U.S. Pat. No. 5,229,125, Jul. 20, 1993, "Patarcity et al.", discloses a "polymer resin-molluscicidal composite from which valves, linings, coating and encapsulators can be produced.

U.S. Pat. No. 5,209,934, May 11, 1993, "Ekis et al." discloses the control of zebra mussels by treating waters in which they grow with a chlorine solution and a bromide salt capable of releasing bromide ions to the chlorine solution.

U.S. Pat. No. 5,192,451, Mar. 6, 1993, "Gill", discloses controlling zebra mussels in ship ballast tanks by treating ballast water with a water-soluble dialkyl diallyl quaternary ammonium polymer.

U.S. Pat. No. 5,040,487, Aug. 20, 1991, "Bollyky et al.", discloses the use of ozone to control zebra mussels in a (raw) water system or in the intake water of a power plant cooling system or of an industrial process water system.

During a brief search directed to apparatus, according to the present invention, for treating well water, the following patents were noted:

U.S. Pat. No. 5,103,914 discloses a system for treating well water. The system includes a small pipe for diverting a small percentage of water being pumped from the well, through a chamber containing concentrated treatment chemicals producing a solution of the water treatment chemicals and the water. The solution is then injected into the well casing and the volume between the casing and the standpipe serves as a retention chamber for treating water before it is drawn from the well.

U.S. Pat. No. 5,080,805 discloses a method and apparatus for removing iron from well water. The method entails the delivery of air, underground, to precipitate dissolved iron and the collection of the precipitated iron compounds in a bag which can be removed from the well.

U.S. Pat. No. 5,015,370 discloses a method for treating well water wherein an aerator located below the frost line and below the water table causes gases such as hydrogen sulfide to be released from the water and causes dissolved iron and manganese to oxidize and precipitate out of the water. The flow of water through the aerator is preferably controlled by a timed solenoid valve to cause periodic recycling of water through the aerator. U.S. Pat. No. 4,444,259 discloses a method for removing hydrogen sulfide from well water before it is pumped from the well. According to the method, water at the level of the water table is aerated to facilitate the release of hydrogen sulfide gases to the atmosphere.

BRIEF DESCRIPTION OF THE INSTANT INVENTION

The instant invention is a water treatment chemical delivery apparatus in combination with a water intake system which intermittently draws water from an aquifer, including lakes and rivers. The water system has a water inlet which, in the case of a system for drawing water from a lake or a river, is under the surface of a lake or river and which, in the case of a well system, is underground. In either case, the system further comprises a water storage tank, a water pump, an inlet pipe operably connecting the water pump and the water inlet, a detector/controller operable to sense the water level in the storage tank and to energize and de-energize the water pump, as required, to maintain the water level in the tank within predetermined limits, and an outlet line through which water can flow from the tank to the plumbing system served by the system. The water pump is operably connected to discharge water into the interior of the storage tank. Such systems are in use today, drawing water from underground aquifers, rivers and lakes.

The apparatus for delivering a water treatment chemical has a tank for storing the chemical, preferably in a diluted form, a chemical delivery conduit operably connected so that, when water is being drawn into the system, the chemical is withdrawn from the tank and delivered to the interior of the water inlet pipe near the water inlet. In the case of a system which draws water from a lake or a river which is or may be inhabited by zebra mussels, the preferred water treatment chemical is chlorine and the delivery of chlorine is controlled by the apparatus so that, at a given chlorine concentration in the chlorine storage tank, the chlorine concentration of a mixture in the inlet pipe of chlorine from the chemical storage tank and water from the lake or river pumped through the water inlet by the water pump is sufficiently high to be lethal to zebra mussels, but not sufficiently high that the mixture has an objectionable chlorine odor. The delivery of the chlorine may be achieved, according to the invention, by siphoning or by pumping. In the latter case, a chlorine pump is operably connected so that it is energized whenever the water pump is energized, and de-energized whenever the water pump is de-energized. Other chemicals for killing zebra mussels are known and those which are non-toxic to humans at concentrations which are lethal to zebra mussels may be used in place of chlorine. Such chemicals, including chlorine, will be referred to hereinafter as zebra mussel control agents.

In the case of a well system, water taken in through the system may well contain an objectionable level of hydrogen sulfide, the source of the well known but unpopular "egg" smell. Chlorine is operable to reduce the level of hydrogen sulfide in water and this ability is enhanced by thorough mixing of the chlorine with the water. Other chemicals, such as chelating agents, are known for use in improving the quality of water drawn from an underground aquifer and such chemicals will be referred to hereinafter as well water treatment chemicals.

DETAILED DESCRIPTION OF THE PREFERRED EMBODIMENTS

Figure 1:
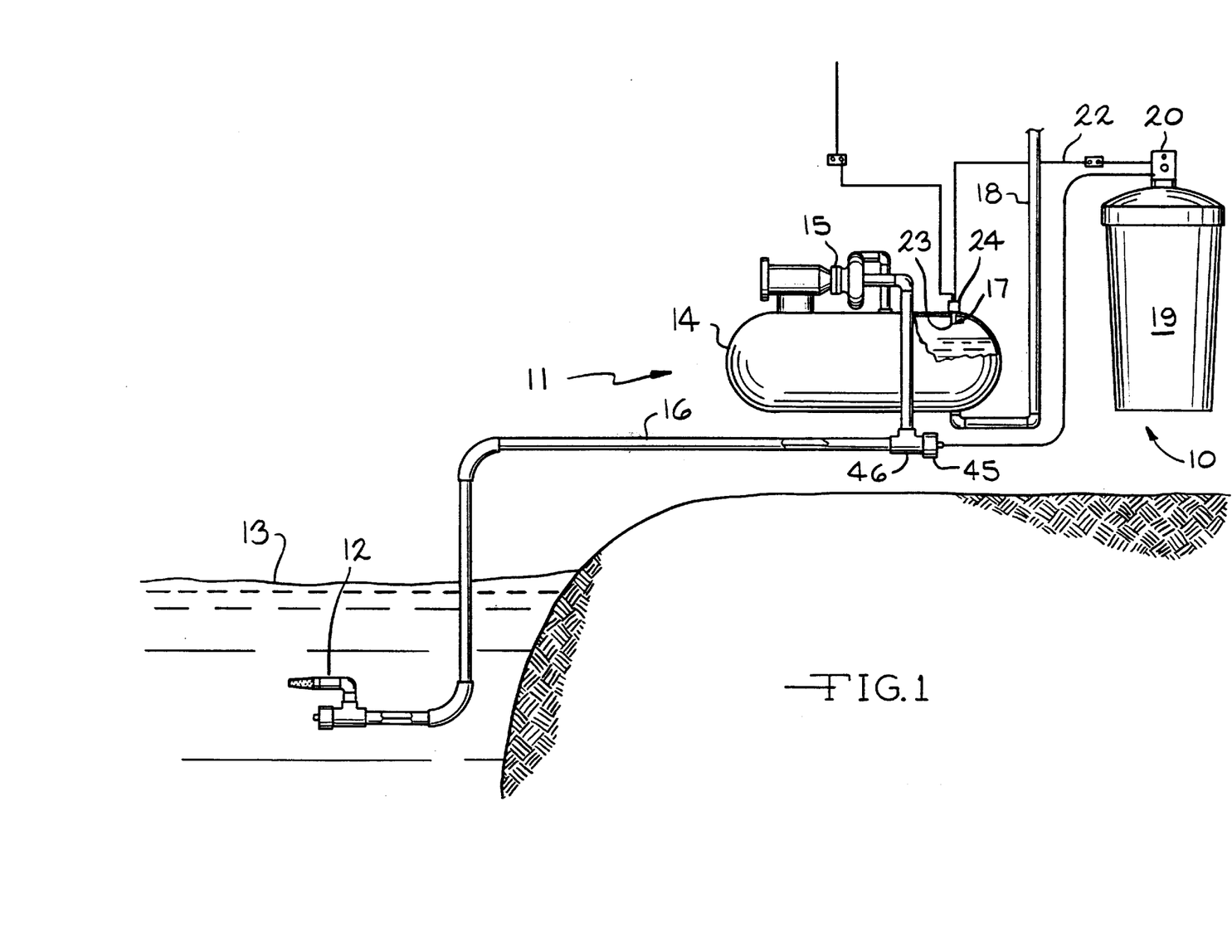
FIG. 1 of the attached drawings is a somewhat schematic diagram showing a combination according to the invention of apparatus for delivering a water treatment chemical to a water system intake with a water system which draws water from a lake or a river.

Apparatus according to the invention indicated generally at 10 is shown in FIG. 1 in combination with a water supply system, which is indicated generally at 11. The water system 11 has a water inlet 12 under the surface of an outdoor body of water, which is designated 13, a water storage tank 14, a water pump 15, an inlet pipe 16 which operably connects the water pump 15 and the water inlet 12, a detector/controller, preferably in the form of a pressure switch indicated generally at 17 which is operable to control the water level in the storage tank and to energize and de-energize the water pump 15 as required to maintain the water level in the tank within predetermined limits, and an outlet line 18 through which water can flow from the tank 14 to the plumbing system (not illustrated) served by the water supply system 11. The water pump 15 is operably connected to discharge water into the interior of the storage tank 16. The apparatus 10 has a tank 19 for storing dilute aqueous chlorine or some other zebra mussel control agent, a pump 20 operably connected to withdraw the zebra mussel control agent from the tank 19, and to deliver the zebra mussel control agent to the interior of the water inlet pipe 16 near the water inlet 12. The capacities of the water pump 15 and of the pump 20 are such that, at a given zebra mussel control agent concentration in the storage tank 19, the zebra mussel control agent concentration of a mixture in the inlet pipe 16 of effluent from the pump 20 and water from the outdoor body 13 pumped through the water inlet 12 by the water pump 15 is sufficiently high to be lethal to zebra mussels, but is not sufficiently high that the mixture poses a health risk to humans who would ingest it. In the case where the zebra mussel control agent is chlorine, the capacities of the water pump 15 and of the pump 20 are such that, at a given chlorine concentration in the storage tank 19, the chlorine concentration of a mixture in the inlet pipe 16 of effluent from the pump 20 and water from the outdoor body 13 pumped through the water inlet 12 by the water pump is sufficiently high to be lethal to zebra mussels, i.e., contains at least about 0.2 parts per million of chlorine, but is not sufficiently high that the mixture has an objectionable chlorine odor, i.e., contains less than about 0.6 parts per million of chlorine. The pump 20 is operably connected by a line 22 to receive power whenever the water level in the tank 14 is low, a diaphragm 23 of the detector/controller 17 closes a switch 24, energizing the pump 15 and energizing the pump 20. As soon as the water in the tank 14 reaches a predetermined level, the diaphragm 23 opens the switch 24, de-energizing the pump 15 and preventing the energization of the pump 20. Accordingly, the pump 20 is energized whenever the water pump 15 is energized, and is de-energized whenever the water pump is de-energized.

Figure 2:
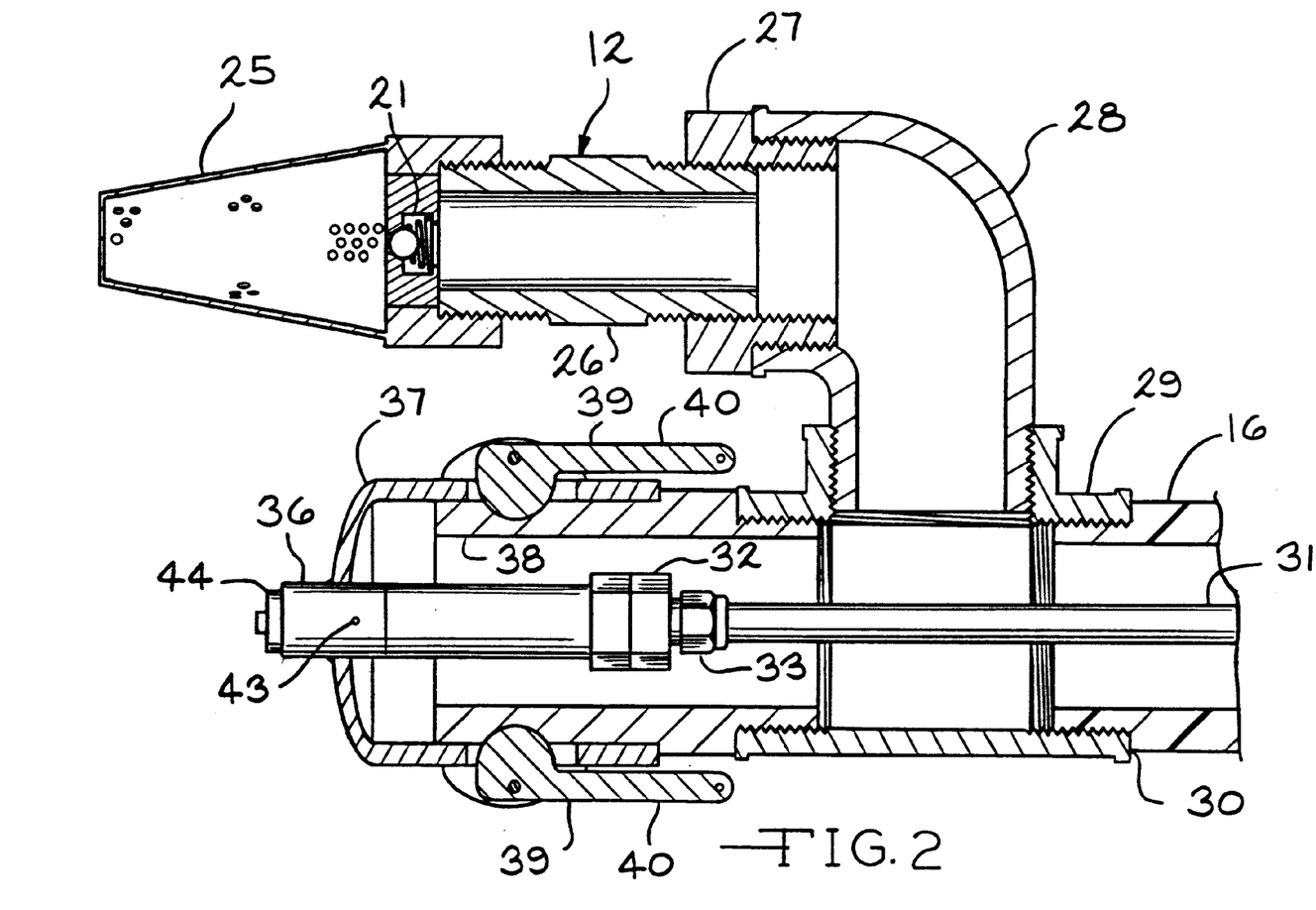
FIG. 2 is a vertical sectional view showing a water inlet and an outlet for a zebra mussel control agent, both of which are parts of the apparatus of FIG. 1.
Figure 3:
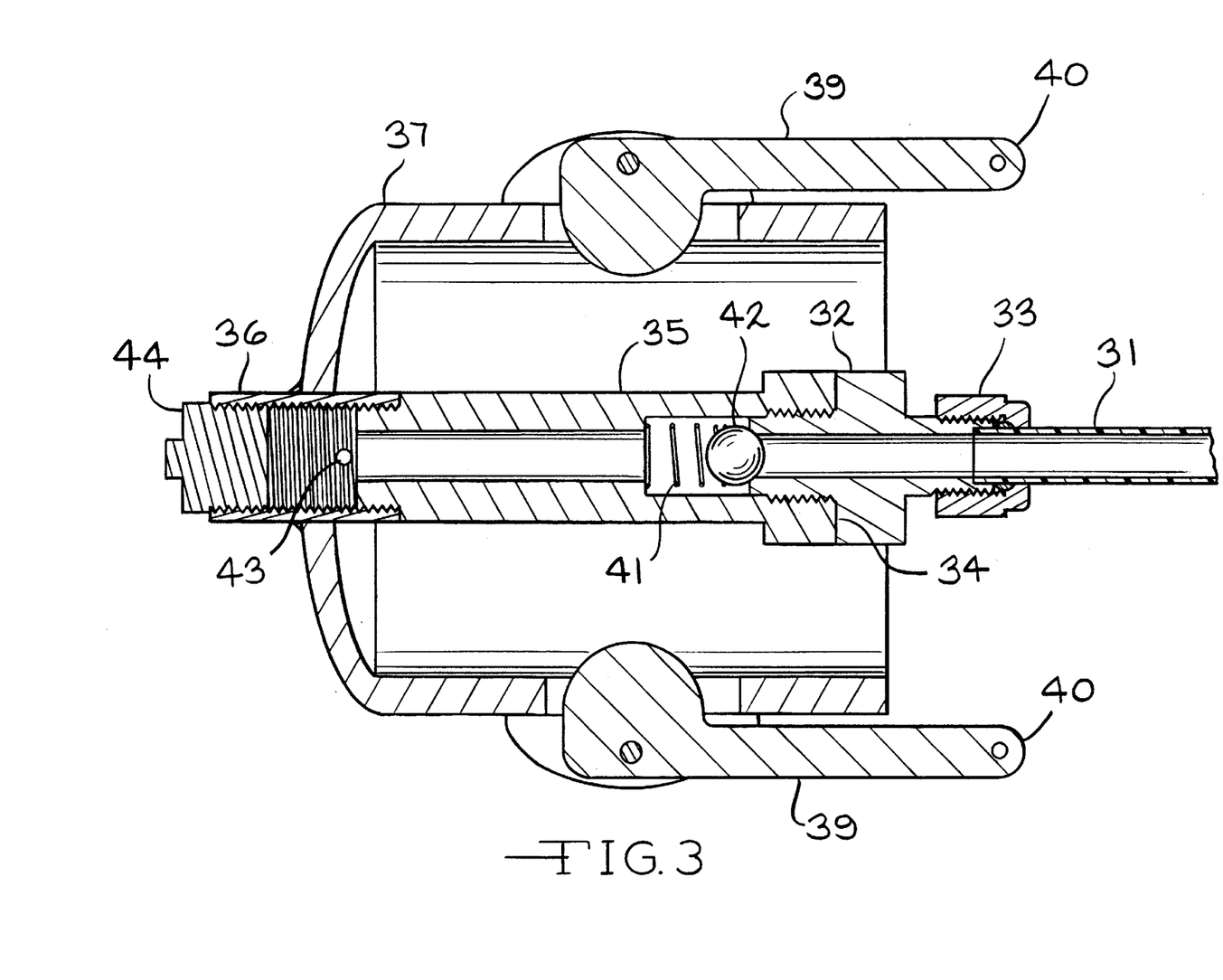
FIG. 3 is an enlarged view in vertical section showing further details of the outlet for a zebra mussel control agent in the apparatus shown in FIGS. 1 and 2.

Referring to FIGS. 2 and 3, the water inlet 12 is made up of an inlet tip 25 with a check valve 21 operable to prevent the flow of water from the inlet back into the body of water 13, a sleeve 26, a reducer 27 and an elbow 28. One end of the elbow 28 is threaded into a leg of a T 29, while the reducer 27 is threaded into the other end of the elbow 28. One end of the sleeve 26 is threaded into the reducer 27, while the other end is threaded into the inlet screen tip 25. Accordingly, the entire inlet 12 can be removed from the T 29, and disasemmbled to whatever extent may be necessary for inspection and servicing, if necessary.

The T 29 is threaded onto an inlet end 30 of the water inlet pipe 16 (see FIG. 2). A zebra mussel control agent conduit 31 extends through the inlet end 30 of the pipe 16 and through the T 29 to a check valve indicated generally at 32. As shown in FIG. 1, one end of the conduit 31 is operably associated with the pump 20 to receive an aqueous zebra mussel control agent therefrom; the other end, as just described and as shown in FIGS. 2 and 3, extends to the check valve 32, to which it is coupled for example, by a compression nut, as indicated at 33. One end, designated 34, of a zebra mussel control agent discharge tip 35 is threaded onto the exterior of the check valve 32, while the other end is threaded into a zebra mussel control agent outlet indicated generally at 36, which is a part of a quick disconnect cap 37 for a quick disconnect fitting 38 that is threaded into the T 29 (FIG. 2). The cap 37 is attached to the fitting 38 by two quick disconnect members 39 which, in the positions shown in FIGS. 2 and 3, lock the cap 37 to the fitting 38. When handles 40 of the members 39 are rotated away from the fitting 38, the cap 37 can be rotated so that it is advanced to the left (see FIG. 3) out of threaded engagement with the zebra mussel control agent discharge tip 35.

When the water pump 15 and the zebra mussel control agent pump 20 are not operating, a spring 41 seats a ball 42 inside the check valve 32, preventing the flow of water through the check valve 32 and into the zebra mussel control agent conduit 31 as well as the flow of zebra mussel control agent through the check valve to the discharge tip 35. When the pumps 15 and 20 are energized, aqueous zebra mussel control agent is pumped through the conduit 31 and the check valve 32, forcing the ball 42 from its seat, and flows through the interior of the zebra mussel control agent discharge tip 35 and openings 43 (one of which is shown in FIGS. 2 and 3) to the exterior of the discharge tip 35, where it mixes with water entering the system through the water inlet 12, and the mixture is pumped into the tank 14. A closed plug 44 prevents the escape of the aqueous zebra mussel control agent from the end of the zebra mussel control agent outlet 36.

Referring to FIG. 1, the zebra mussel control agent conduit 31 connects the pump 20 to a fitting 45, with which it is engaged, extending through a T 46 and the inlet pipe 16 to the check valve 32 as shown in FIGS. 2 and 3.

The apparatus shown in FIGS. 1–3 and described above with reference thereto has been installed in the water system of a private home on an island in the St. Lawrence River, Ontario, Canada, and operated for about three years now with dilute aqueous chlorine as the zebra mussel control agent. Fifty water samples taken from the system during the first ten weeks of operation were analyzed for chlorine content, which was found to range from a low of 0.25 parts per million to a high of 0.50 parts per million, mean value 0.28 parts per million. The concentration of chlorine in the tank 19 required to achieve the desired chlorine level in the system was estimated from manufacturer's data concerning the performance of the pumps 15 and 20, and aqueous chlorine of the estimated concentration was charged to the tank 19. Water was drained from the tank 14 through a valve (not illustrated), and the pumps 15 and 20 were operated for a period of about 10 minutes. The chlorine content of the water in the tank 14 was then checked, using a commercially available kit, and was found, on this occasion, to be 0.25 parts per million, which was deemed to be satisfactory. Had it been either too high or to low, however, it would have been a simple matter to adjust the pump to decrease or increase the flow of aqueous chlorine, as needed. Alternatively, the adjustment in concentration could be achieved by adding water or chlorine to lower or raise the chlorine content in the tank 19, as required.

Figure 4:
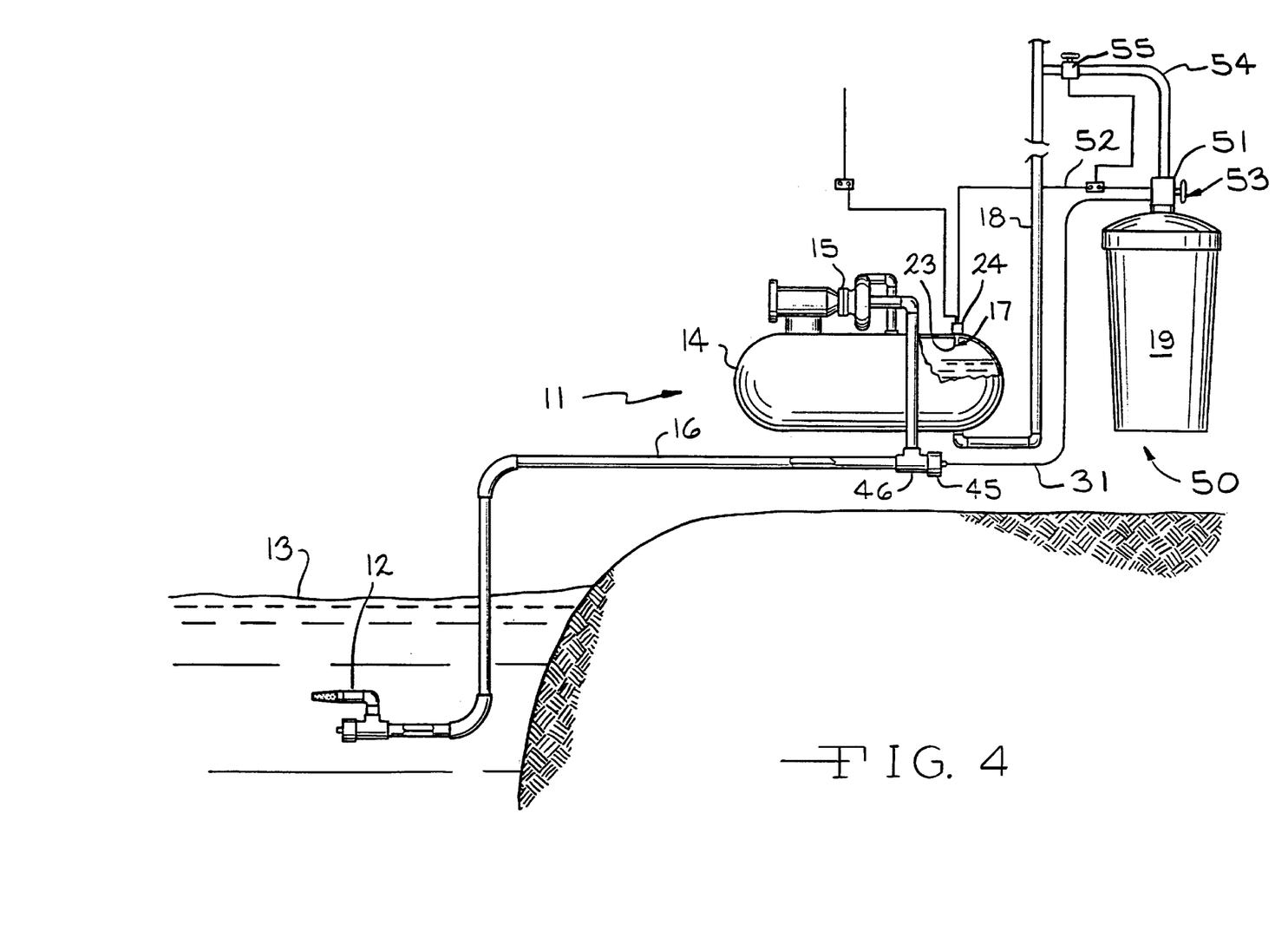
FIG. 4 is a somewhat schematic diagram showing a combination according to the invention of a second embodiment of apparatus for delivering a water treatment chemical to a water system intake with a water system which draws water from a lake or a river.

Apparatus according to a second embodiment of the invention, indicated generally at 50, is shown in FIG. 4 in combination with a water supply system, which is indicated generally at 11. The water supply system 11 and many components of the apparatus 50 in FIG. 4 correspond with those illustrated in FIGS. 1 through 3 and like reference numerals have been used to refer to them in FIG. 4.

The apparatus 50 differs from the apparatus 10 in that the pump 20 in the latter has been replaced in the former by a solenoid valve 51 which is operable in a first condition and inoperable in a second condition to prevent the flow of zebra mussel control agent from the tank 19. The solenoid valve 51 is operably connected by a line 52 so that it receives a signal from the detector/controller 17 whenever the pump 15 is energized and that signal is operable to cause the valve 51 to be in the second condition, i.e., open. Whenever the pump 15 is de-energized, the solenoid valve 51 receives a signal that is operable to cause it to be in the first condition, closed. It will be appreciated that either signal may actually be the absence of a signal. Accordingly, the valve 51 is open whenever the water pump 15 is energized, and is closed whenever the water pump 15 is de-energized. When the valve 51 is closed, the check valve 21 is also closed and when the valve 51 is open, the check valve 21 is also open.

In this embodiment, the flow of the zebra mussel control agent from the tank 19 is achieved through suction, rather than by pump action. The suction is achieved through the movement of water through the inlet 12, past the quick disconnect fitting 38, where it is threaded into the T 29 (all of which are shown in FIG. 2). This suction induces a flow of a water treatment chemical, namely a zebra mussel control agent, from the tank 19 and through the conduit 31 whenever the water pump 15 is activated and is discontinued when the water pump 15 is de-energized. The suction/induction is sufficient to open the check valve 32. Accordingly, when the water pump 15 is actuated, zebra mussel control agent from the tank 19 flows into and through the conduit 31, the check valve 32, through the interior of the zebra mussel control agent discharge tip 35 and openings 43 (one of which is shown in FIGS. 2 and 3) to the exterior of the discharge tip 35, where it mixes with water entering the system through the water inlet 12, and the mixture is pumped into the tank 14.

As in the apparatus described above with reference to FIGS. 1 through 3, the apparatus 50 is operable to deliver a zebra mussel control agent to a point adjacent to the inlet 12 where it mixes with incoming water and in an amount such that the concentration of the agent in the mixture is sufficiently high that the mixture is lethal to zebra mussels and sufficiently low that it is not objectionable to humans. The concentration of the agent in the mixture is controlled by a flow adjustment device 53 which is preferably a needle valve. The flow adjustment device 53 is shown in FIG. 4 to be a part of the valve 51 although the device 53 can be independent thereof.

If desired, the apparatus 50 may include a circuit for circulating, whenever the pump 15 is energized, a relatively small amount of a mixture of the water treatment chemical and the water from the outlet line 18 into and through the water treatment chemical conduit 31 to augment the suction which draws the water treatment chemical into the conduit 31. For this purpose, there is shown a conduit 54 including a second solenoid valve 55 operably connected to deliver a mixture from line 18 into the solenoid valve assembly 51 and into the conduit 31. This flow is operable to induce or assist in inducing the flow of the water treatment chemical from the tank 19, when the pump 15 is operating. The second solenoid valve 55 is also connected to receive a signal from the detector/controller 17 whenever the pump 15 is energized and that signal is operable to open the second solenoid valve 55.

Figure 5:
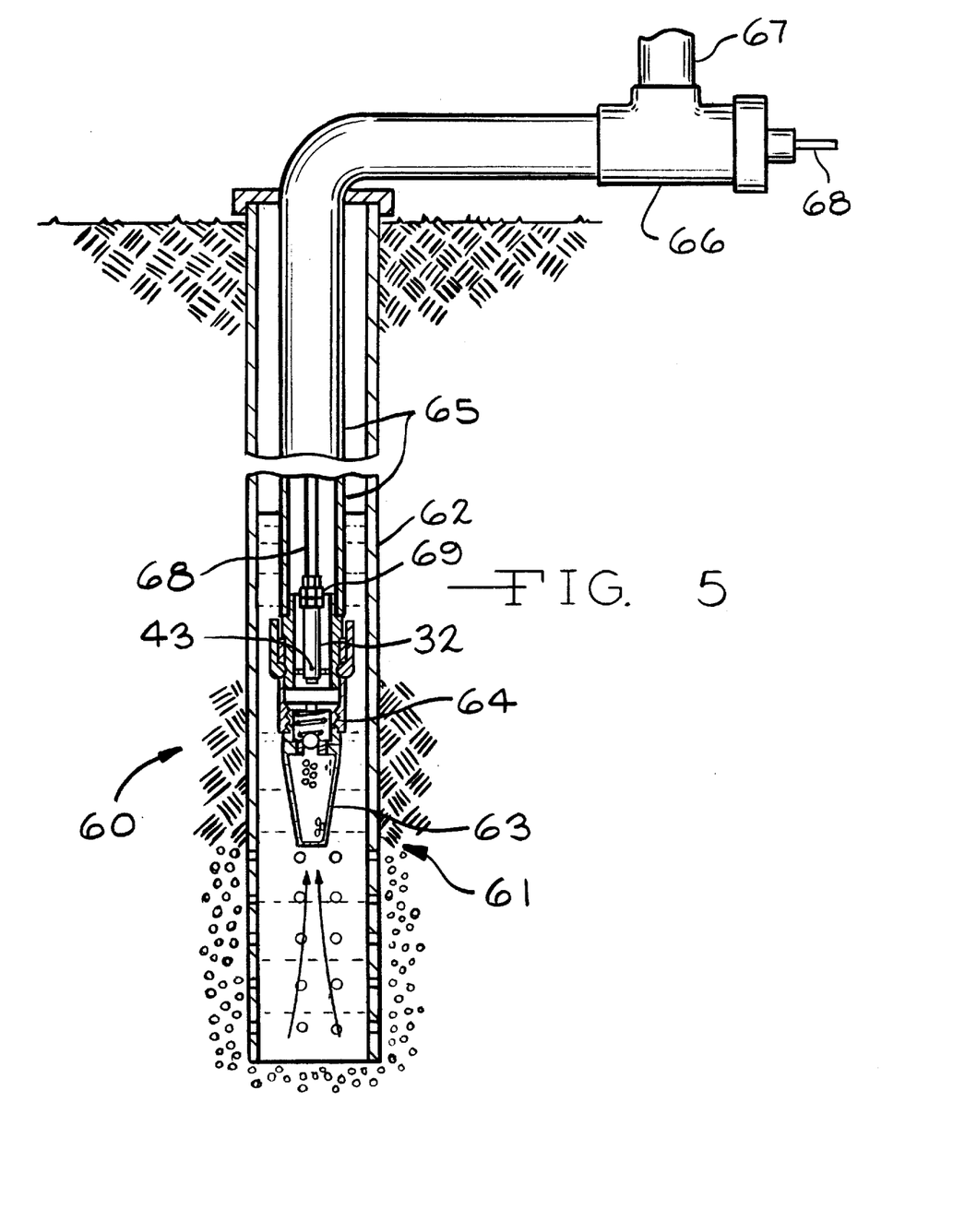
FIG. 5 is a view, partially in cross section, showing a portion of apparatus for delivering a water treatment chemical to a water system intake in combination with a water system which draws water from an underground aquifer in combination with a deep well.

Referring now to FIG. 5, the underground, water intake portion of apparatus in accordance with the present invention, indicated generally at 60, is shown in combination with a deep well fresh water system, indicated generally at 61. The deep well system includes a well casing 62, a water inlet screen 63 and, preferably, a check valve 64 positioned adjacent to the inlet 63. The intake portion 60 is designed to operate in combination with a water system corresponding with the above ground portion of the water system shown in FIG. 4 comprising a water pump (not shown but corresponding with the pump 15 in FIG. 4) operably connected to pump water through the screen 63, the check valve 64, into a line 65, a T 66 and a line 67 to a storage tank (not shown but corresponding with the tank 14 in FIG. 4). The water pump is operated, as needed, to maintain a desired water level in the storage tank, under the control of a detector/controller (not shown but corresponding with the controller 17 in FIG. 4). Such a detector/controller, preferably in the form of a pressure switch, is operable to control the water level in the storage tank and to energize and de-energize the water pump as required to maintain the water level in the storage tank within predetermined limits. Water flows from the storage tank to plumbing (not illustrated) served by the well system 61.

A well water treatment chemical from a tank (not illustrated but corresponding with the tank 19 in FIG. 4) is delivered, when the water pump is activated, through a water treatment chemical conduit 68 to a fitting 69. The water pump is operable to draw water through the intake screen 63, the check valve 64 and into the line 65. The water treatment chemical conduit 68 extends through the line 65 and is connected to a check valve indicated generally at 32. The other end of the conduit 68 is connected to a solenoid valve (not shown but corresponding with the solenoid valve 51 in FIG. 4) which is connected, in turn, to receive a well water treatment chemical from a tank corresponding with the tank 19, as described above with reference to FIG. 4. When the water pump is energized, the well water treatment chemical flows through the conduit 68, through the check valve 32 and out of openings 43 where it mixes with water pumped by the water pump from the well and flows into the line 65 and to the water storage tank.

Figure 6:
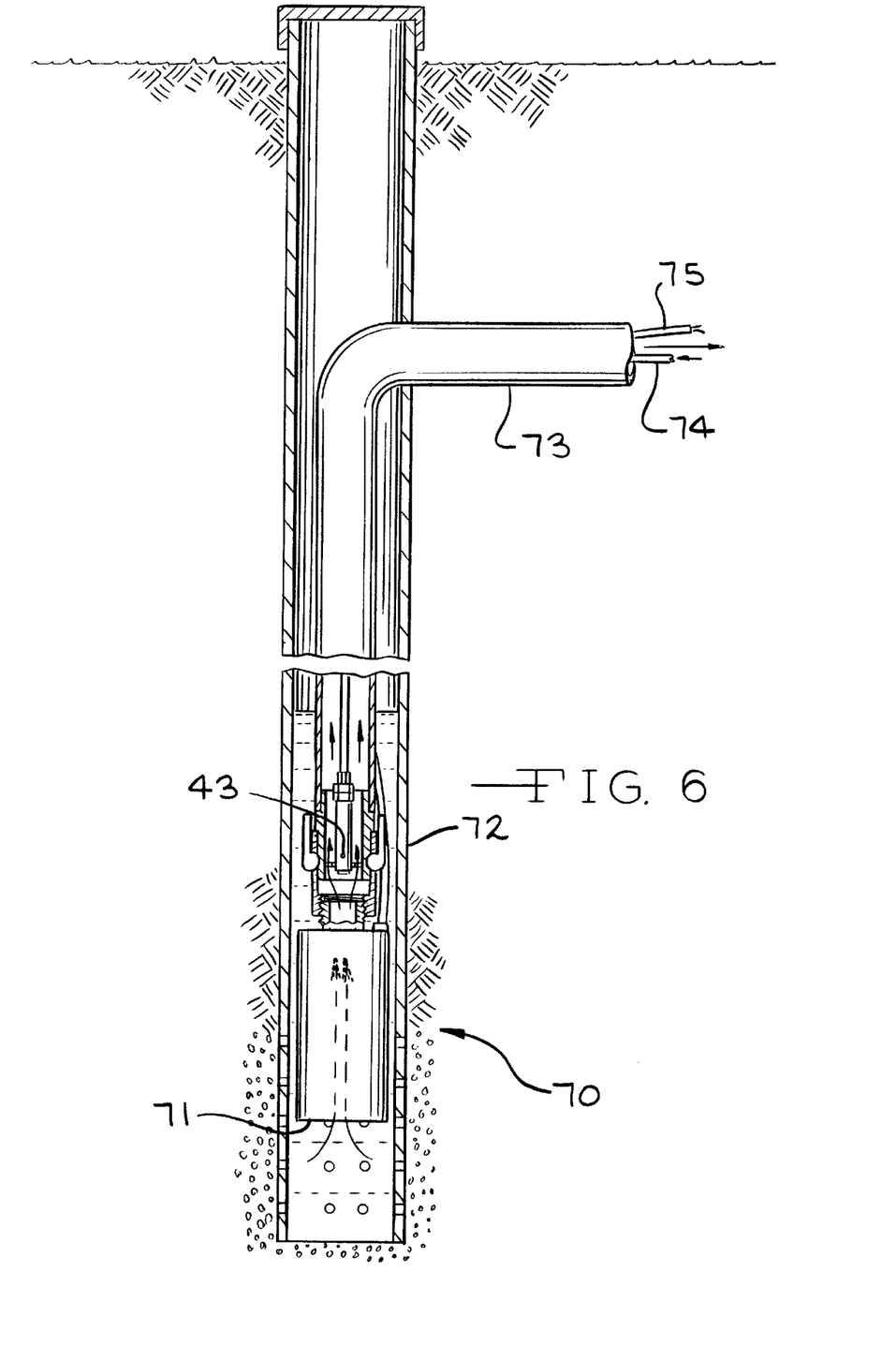
FIG. 6 is a view, partially in cross section, showing a portion of apparatus, similar to the apparatus shown in FIG. 5, for delivering a water treatment chemical to a water system intake in combination with a water system which draws water from an underground aquifer in combination with a deep well.

Turning now to FIG. 6, apparatus which is similar to the apparatus 61 shown in FIG. 5, is indicated at 70 in FIG. 6. The apparatus 70 includes a pump 71 within a well casing 72 for pumping water from the well into and through a line 73 to a water storage tank (not shown). In this embodiment, a water treatment chemical is pumped from a well water treatment chemical tank (not shown but corresponding with tank 19 in FIG. 1) by a pump (not shown but corresponding with the pump 20 shown in FIG. 1), through a water treatment chemical conduit 74 carried within the line 73 and discharged from openings 43, whenever the pump 71 is energized. Preferably, the pump 71 is energized in response to a signal from a detector controller (not shown but corresponding with the detector controller 24 shown in FIG. 1) indicating a low level of water in a water storage tank. The pump 71 is energized, through a line 75, and de-energized, as needed, to maintain the level of water in the storage tank within predetermined limits. When the pump 71 is energized, a well water treatment chemical is pumped through the conduit 74 by a pump corresponding with pump 20 in FIG. 1 from a tank corresponding with tank 19 in FIG. 1. The water and the well water treatment chemical then flow up line 73 to the water storage tank, mixing with each other as they flow. When the pump 73 is de-energized, no well water treatment chemical flows through the line 74.

Figure 7:
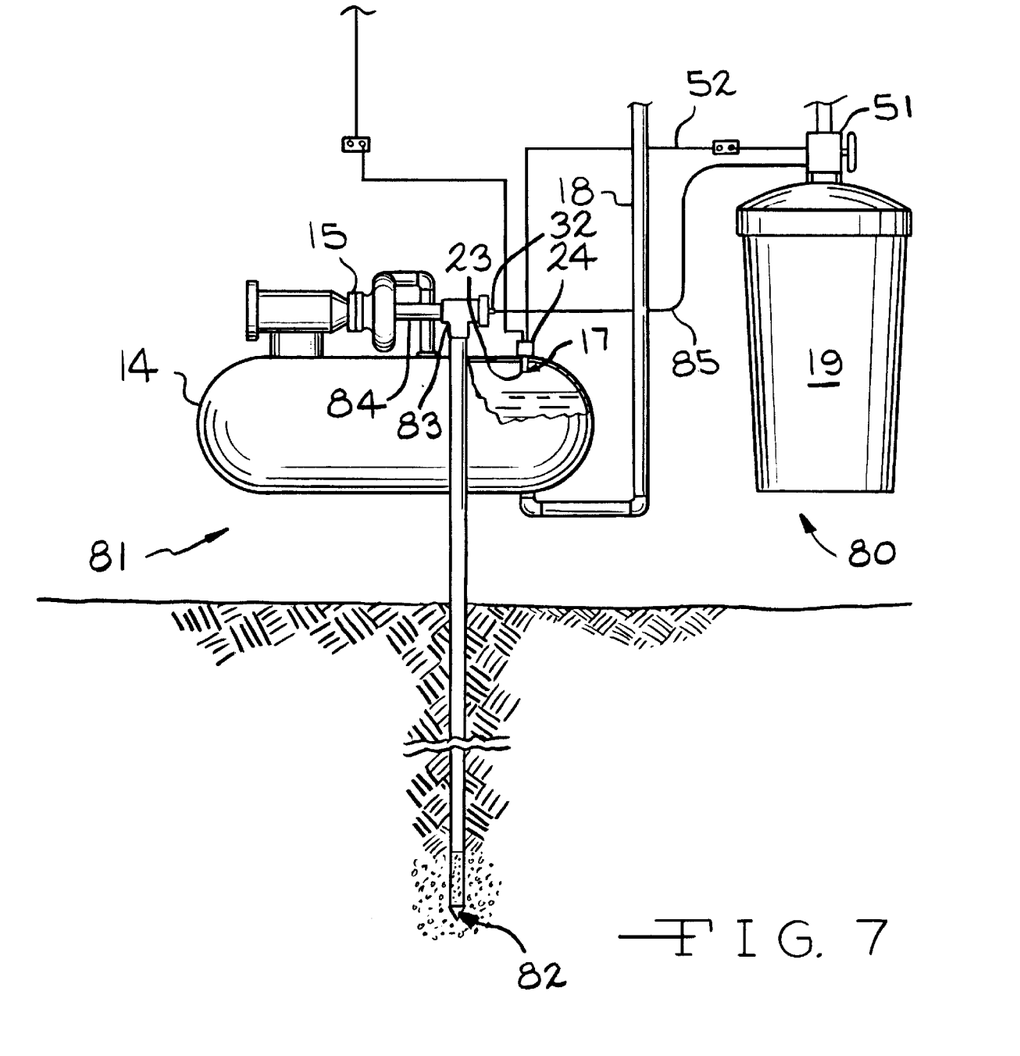
FIG. 7 is a somewhat schematic view, showing a combination according to the invention of apparatus for delivering a water treatment chemical to a water system intake with a water system which draws water from an underground aquifer through a sand point.

Referring now to FIG. 7, apparatus according to another embodiment of the invention is indicated generally at 80 in combination with a water supply system, which is indicated generally at 81. The water supply system 81 corresponds with the water supply system 11 shown in FIG. 4, except that the FIG. 7 water supply system 81 draws water from an underground aquifer through a sand point 82. The apparatus 80 in FIG. 7 corresponds closely with the apparatus 50 shown in FIG. 4 and like reference numerals have been used to refer to them in FIG. 7.

In the apparatus 80, water is pumped by the pump 15 from the sand point 82, into and through a T 83, a line 84 and into the tank 14. The operation of the pump 15 is controlled by the detector/controller 17 so that the pump 15 operates, as needed, to maintain the level of water in the tank 14 within predetermined limits. A well water treatment chemical storage tank 19 is operably connected to a solenoid valve 51 which is operable in a first condition and inoperable in a second condition to prevent the flow of a well water treatment chemical from the tank 19. The solenoid valve 51 is operably connected by a line 52 so that it receives a signal from the detector/controller 17 whenever the pump 15 is energized and that signal is operable to cause the valve 51 to be in the second condition, i.e., open. Whenever the pump 15 is de-energized, the solenoid valve 51 receives a signal that is operable to cause it to be in the first condition, closed. It will be appreciated that either signal may actually be the absence of a signal. Accordingly, the valve 51 is open whenever the water pump 15 is energized, and is closed whenever the water pump 15 is de-energized.

In this embodiment, the flow of the well water treatment chemical from the tank 19 is achieved through suction. The suction is achieved through the movement of water through the sand point 82 and through the T 83 under the action of the pump 15. This suction induces a flow of well water treatment chemical from the tank 19 and through the conduit 85 whenever the water pump 15 is activated and the flow of the treatment chemical is discontinued whenever the water pump 15 is de-energized. The well water treatment chemical conduit 85 terminates, preferably, in a check valve 32 which is connected to the T 83 and which, when open, provides communication between the conduit 85 and the interior of the T 83. The suction/induction is sufficient to open the check valve 32. Accordingly, when the water pump 15 is actuated, the well water treatment chemical from the tank 19 flows into and through the conduit 85, the check valve 32, and into the interior of the T 83, through openings (not shown, but corresponding with openings 43 shown in FIG. 3) so that the chemical mixes with water entering the T 83 from the sand point 82, and the mixture is pumped into the tank 14.

It will be appreciated that various changes and modifications can be made from the specific details of the invention as shown in the attached drawings and described with reference thereto without departing from the spirit and scope of the invention as defined in the attached claims. For example, the circuit comprising the conduit 54 and the valve 55 may be incorporated in the water treatment chemical delivery systems shown in FIGS. 5 and 7 to augment the induction of the flow of the water treatment chemical from the tank 19.

We claim:

1. A method for maintaining, at a level which is within predetermined limits, a mixture of water drawn from an aquifer and a water treatment chemical, in a storage tank, or delivery, as needed, into a water supply system, said method comprising the steps of detecting a low level in said storage tank, energizing, in response to the detected low level, a pump operably connected so that, when it is energized, it pumps water from the aquifer, through a water inlet positioned in and beneath the surface of the aquifer, through a water conduit and into said storage tank, delivering the water treatment chemical whenever, and only when, said pump is pumping water to the storage tank, from a water treatment chemical tank to the interior of said water conduit adjacent to said water inlet, and discharging the water treatment chemical within said water conduit, pumping the mixture of water and water treatment chemical to the storage tank, and continuously preventing the discharge of the water treatment chemical into the aquifer.

2. The chlorinator claimed in claim 1 which further comprises a valve which is operably connected in said chlorine conduit so that it closes and prevents the discharge of chlorine into said inlet pipe when said water pump is de-energized and so that it opens, to enable the discharge of chlorine into said inlet pipe when said water pump is energized.

3. A chlorinator in combination with a water supply system, said water supply system having a water inlet under the surface of an aquifer, a pressurized water storage tank, a water pump operably connected to discharge water into the interior of said water storage tank, an inlet pipe operably connecting said water pump and said water inlet, a detector and a controller, said detector and said controller being operable, together with said pump to control the water level in said storage tank and to energize and de-energize said water pump as required to maintain the water level in said tank within predetermined limits, and an outlet line through which water can flow from said tank of the water supply system, said chlorinator comprising a tank for storing chlorine, a chlorine conduit operably connected in the chlorinator so that it is operable, when said water pump is energized, and inoperable, when said water pump is dc-energized, to conduct chlorine from said tank to the interior of said inlet pipe near said water inlet where it is mixed with water from the aquifer, and a valve for controlling the rate at which the chlorine is delivered to the interior of said inlet pipe so that, for a given chlorine concentration of the aqueous chlorine, the chlorine concentration of the mixture of aquifer water and chlorine in the inlet pipe is sufficiently high to be lethal to zebra mussels, but not sufficiently high that the mixture has an objectionable chlorine odor.

4. The chlorinator claimed in claim 3 which further comprises a valve which is operably connected in said chlorine conduit so that it closes and prevents the discharge of chlorine into said inlet pipe when said water pump is de-energized and so that it opens, to permit the discharge of chlorine into said inlet pipe when said water pump is energized.

5. A water treatment system in combination with a water supply system, said water supply system having a water inlet under the surface of an aquifer, a pressurized water storage tank, a water pump operably connected to discharge water into the interior of said water storage tank, an inlet pipe operably connecting said water pump and said water inlet, a detector and a controller, said detector and said controller being operable, together with said pump, to control the water level in said storage tank and to energize and de-energize said water pump as required to maintain the water level in said tank within predetermined limits, and an outlet line through which water can flow from said tank of said water supply system, said water treatment system comprising a tank for storing a water treatment chemical, a water treatment chemical conduit operably connected in the water treatment system so that it is operable, when said water pump is energized, and inoperable, when said water pump is de-energized, to conduct the water treatment chemical from said water treatment chemical tank to the interior of said inlet pipe near said water inlet where it is mixed with water from the aquifer, a first valve for controlling the rate at which the water treatment chemical is delivered to the interior of said inlet pipe and a second valve which is operably connected in said water treatment chemical conduit so that it closes and prevents the discharge of water treatment chemical into said inlet pipe when said water pump is energized and so that it opens, to enable the discharge of water treatment chemical into said inlet pipe when said water pump is energized.

\* \* \* \* \*